(12) United States Patent
Zhou

(10) Patent No.: US 10,972,798 B2
(45) Date of Patent: Apr. 6, 2021

(54) DISPLAY METHOD AND DEVICE FOR ATTACHED MEDIA INFORMATION

(71) Applicant: Tencent Technology (Shenzhen) Company Limited, Shenzhen (CN)

(72) Inventor: Bin Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/138,511

(22) Filed: Sep. 21, 2018

(65) Prior Publication Data
US 2019/0028768 A1 Jan. 24, 2019

Related U.S. Application Data

(63) Continuation-in-part of application No. PCT/CN2017/081389, filed on Apr. 21, 2017.

(30) Foreign Application Priority Data

Apr. 22, 2016 (CN) .......................... 201610258407.3

(51) Int. Cl.
*H04N 21/472* (2011.01)
*G06F 3/0486* (2013.01)
(Continued)

(52) U.S. Cl.
CPC ..... *H04N 21/47217* (2013.01); *G06F 3/0486* (2013.01); *G06F 3/04847* (2013.01);
(Continued)

(58) Field of Classification Search
CPC ....... H04N 21/47217; H04N 21/44016; H04N 21/44222; H04N 21/4722; H04N 21/4725;
(Continued)

(56) References Cited

U.S. PATENT DOCUMENTS

| 10,298,902 B1* | 5/2019 | Liao ........................ G11B 27/28 |
| 2002/0069420 A1* | 6/2002 | Russell .................... G06F 21/10 |
| | | 725/92 |

(Continued)

FOREIGN PATENT DOCUMENTS

| CN | 102547460 A | 7/2012 |
| CN | 103702148 A | 4/2014 |

(Continued)

OTHER PUBLICATIONS

Tencent Technology, ISRWO, PCT/CN2017/081389, dated Jul. 12, 2017, 6 pgs.
Tencent Technology, IPRP, PCT/CN2017/081389, dated Oct. 23, 2018, 5 pgs.

*Primary Examiner* — Benjamin R Bruckart
*Assistant Examiner* — Akshay Doshi
(74) *Attorney, Agent, or Firm* — Morgan, Lewis & Bockius LLP

(57) ABSTRACT

This application discloses a media information display method performed at a computing device. While rendering main media information on the display, the computing device detects a first user input operation, determines a first position of a progress bar on the display corresponding to the first user input operation, and renders additional media information at the first position. After detecting a second user input operation, the computing device moves the progress bar from the first position to a second position of the progress bar on the display corresponding to the second user input operation. The computing device renders the additional media information at the second position of the progress bar on the display and then removes the additional media information from display after a preset time period.

12 Claims, 3 Drawing Sheets

(51) Int. Cl.
*H04N 21/44* (2011.01)
*H04N 21/431* (2011.01)
*H04N 21/442* (2011.01)
*H04N 21/81* (2011.01)
*H04N 21/4725* (2011.01)
*H04N 21/488* (2011.01)
*G06F 3/0484* (2013.01)
*H04N 21/4722* (2011.01)
*H04N 21/845* (2011.01)

(52) U.S. Cl.
CPC ..... *H04N 21/431* (2013.01); *H04N 21/44016* (2013.01); *H04N 21/44222* (2013.01); *H04N 21/4722* (2013.01); *H04N 21/4725* (2013.01); *H04N 21/488* (2013.01); *H04N 21/8126* (2013.01); *H04N 21/8455* (2013.01)

(58) Field of Classification Search
CPC ........... H04N 21/8126; H04N 21/8455; H04N 21/431; H04N 21/488; H04N 21/4312; G06F 3/0486; G06F 3/04847
See application file for complete search history.

(56) References Cited

U.S. PATENT DOCUMENTS

| | | | |
|---|---|---|---|
| 2008/0319852 | A1 | 12/2008 | Gardner et al. |
| 2011/0255840 | A1* | 10/2011 | Bornsen ................ H04N 5/775 386/239 |
| 2013/0322850 | A1* | 12/2013 | Chang ..................... H04N 5/91 386/241 |
| 2014/0143070 | A1* | 5/2014 | DeVree ................ G06Q 30/02 705/14.73 |
| 2015/0104155 | A1* | 4/2015 | Bloch .................... G11B 27/10 386/282 |
| 2016/0275991 | A1* | 9/2016 | Hwang ................ G06F 3/0485 |

FOREIGN PATENT DOCUMENTS

| | | |
|---|---|---|
| CN | 104023271 A | 9/2014 |
| CN | 104703014 A | 6/2015 |
| CN | 104754412 A | 7/2015 |
| CN | 105872713 A | 8/2016 |

* cited by examiner

DISPLAY METHOD AND DEVICE FOR ATTACHED MEDIA INFORMATION

PRIORITY CLAIM AND RELATED APPLICATION

This application is a continuation-in-part application of PCT/CN2017/081389, entitled "ADDITIONAL MEDIA INFORMATION DISPLAY METHOD AND APPARATUS" filed on Apr. 21, 2017, which claims priority to Chinese Patent Application No. 201610258407.3, filed with the Chinese Patent Office on Apr. 22, 2016, and entitled "ADDITIONAL MEDIA INFORMATION DISPLAY METHOD AND APPARATUS", both of which are incorporated by reference in their entirety.

FIELD OF THE TECHNOLOGY

This application relates to the field of Internet technologies, and in particular, to a media information display method and apparatus.

BACKGROUND OF THE DISCLOSURE

Currently, at the same time when main media information is displayed (for example, media files such as a video or audio is played), various additional media information are further pushed. For example, a video advertisement is inserted and promotion information (for example, news and public welfare announcement information) is pushed. However, these additional media information display manners are fixed and undiversified, and the display effect needs to be further improved.

Use a video advertisement as an example. In the existing technology, a presentation manner of the video advertisement and video content that a user is to watch are serial. After the user sends an instruction of playing the video content, the video advertisement is first played in a video play window of a player. In a play period of the video advertisement, the user clicks a video region of the video advertisement by using a mouse (a PC end) or touches (a mobile terminal) the video region of the video advertisement, and a page will redirect to a particular link to obtain further information. Only after the play of the video advertisement is finished can the user watch the video content.

SUMMARY

An embodiment of this application provides a media information display method performed at a computing device having a display, one or more processors and memory storing a plurality of programs to be executed by the one or more processors. While rendering main media information on the display, the computing device detects a first user input operation on the main media information. In response to the first user input operation, the computing device determines a first position of a progress bar of the main media information on the display and renders additional media information at the first position of the progress bar on the display. After detecting a second user input operation on the main media information, the computing device moves the progress bar from the first position to a second position of the progress bar on the display, renders the additional media information at the second position of the progress bar on the display, and removes the additional media information from the display after a preset time period.

An embodiment of this application further provides a computing device having a display, one or more processors, memory coupled to the one or more processors, and a plurality of programs stored in the memory that, when executed by the one or more processors, cause the computing device to perform the aforementioned media information display method.

An embodiment of this application provides a non-transitory computer readable storage medium storing a plurality of programs in connection with a computing device having a display and one or more processors, wherein the plurality of programs, when executed by the one or more processors, cause the computing device to perform the aforementioned media information display method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the technical principles, features and technical effects of the technical solutions of this application clearer, the following further describes the implementations of the technical solutions of this application in detail with reference to specific embodiments.

In some embodiments, a video advertisement is compulsorily played before a video is played, and a main window that occupies the playing of the video further needs to occupy a quantity of time. Consequently, the audience experience is seriously affected, or a user may even feel strongly uncomfortable. In addition, because the user usually chooses to do other things in the play period of the video advertisement, an actual play effect of the advertisement is affected.

Figure 1:
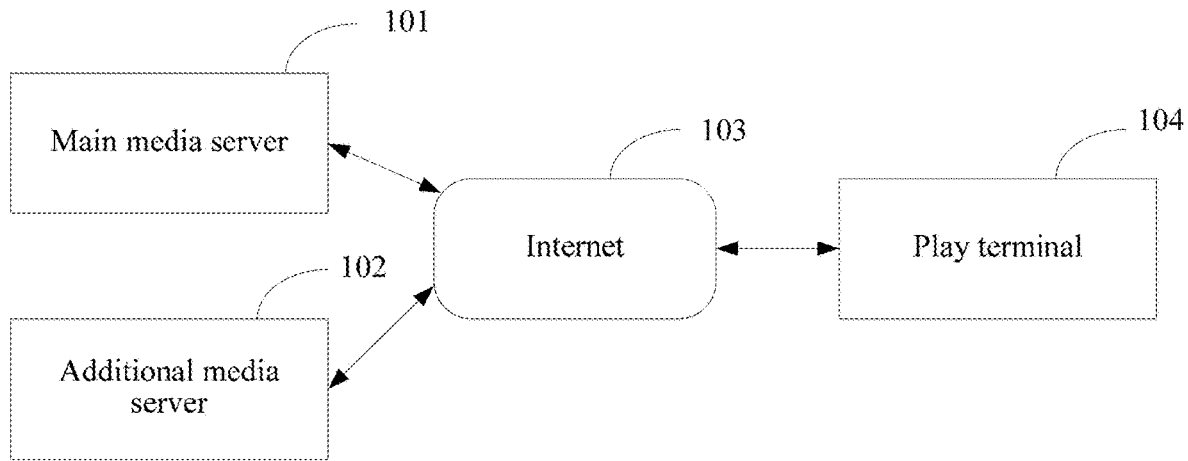
FIG. 1 is a schematic diagram of an implementation environment of a solution of this application.

Based on the foregoing technical problem, this application provides an additional media information display method. The method may be applied to a system architecture shown in FIG. 1. As shown in FIG. 1, a main media server 101 is a server providing main media information, for example, is a play server of a video website, is configured to provide a video content resource, and a representation form is a media stream. An additional media information server 102 is a server providing additional media information content (or referred to as additional media information). The additional media information content includes but is not limited to images, text, animations, videos, audio, or combinations thereof. A play terminal 104 may be various electronic devices such as a mobile terminal or a PC. The mobile terminal includes but is not limited to a smartphone or a tablet computer. The PC may be a personal computer, a notebook computer, an Ultrabook, or the like. The solutions of this application are implemented mainly based on the play terminal 104. A media play client such as a video play application program is installed on the foregoing PC or mobile terminal.

Figure 2A:
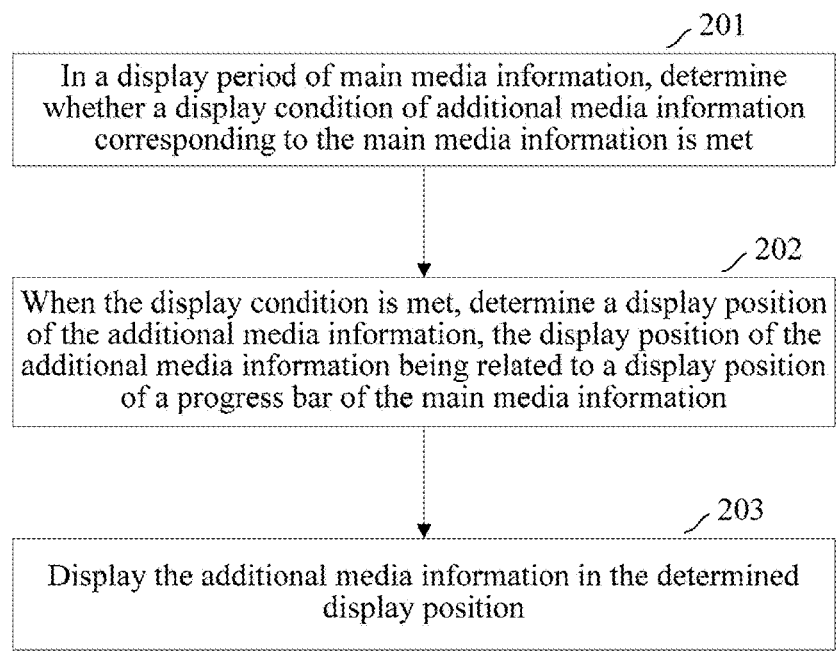
FIG. 2A is a schematic flowchart of an additional media information display method according to an embodiment of this application.

An embodiment of this application provides an additional media information display method. The method is applied to an electronic device on which a media play client is installed (for example, the play terminal 104 in FIG. 1). As shown in the FIG. 2A, the method includes the following steps:

Step 201: In a display period of main media information, when a display condition of additional media information corresponding to the main media information is met, perform step 202. Here, the main media information may be various media files played online (for example, videos or audio). In the display period of the main media information, various additional media information are further pushed. For example, a video advertisement is inserted and promotion information (for example, news and public welfare announcement information) is pushed. The media play client may determine whether the foregoing display condition is met. A specific method may include: determining (for example, listening to) a play progress of the main media information and/or detecting (for example, listening to) an input operation of a user. When it is determined that the play progress of the main media information reaches a preset time point and/or when the input operation of the user is detected, it is determined that the foregoing display condition is met.

Here, the so-called display period of the main media information may refer to one of the following situations: that the media play client prepares to play the main media information (such as a video or an audio file) (the additional media information displayed at this time may be referred to as a pre-roll advertisement), is playing the main media information, suspends the playing of the main media information, or finishes playing the main media information (the additional media information displayed at this time may be referred to as a post-roll advertisement). In a specific application scenario, the main media information is a video of a TV series on demand online, and the additional media information is advertisement data. Step 201 may be performed when the video of the series is prepared to be played (the additional media information in this case is a pre-roll advertisement), or step 201 may be performed in a play process of the video of the series, or step 201 may be performed when playing of the video of the series is suspended or playing of the video of the series is finished (the additional media information in this case is a post-roll advertisement).

In some embodiments, while rendering the main media information on the display, the computing device detects a first user input operation on the main media information. For example, the computing device plays a video on the display using a video player application. In response to the first user input operation (e.g., a finger touch or a mouse click), the computing device determines a first position of a progress bar of the main media information on the display and renders additional media information at the first position of the progress bar on the display.

Step 202: Determine a display position of the additional media information, the display position of the additional media information being related to a display position of a progress bar of the main media information.

In some embodiments, the foregoing display condition may include that the play progress of the main media information reaches the preset time point (for example, a video file used as the main media information is played at the preset time point) and/or that the input operation of the user is received. That the input operation of the user is received may include at least one of the following:

1) receiving an operation performed on a touchscreen of the electronic device;

2) receiving an operation performed on the progress bar;

3) receiving a gesture operation by using a gravity acceleration sensor in the electronic device; and 4) receiving a gesture operation by using a wearable device bound to the electronic device.

Step 203: Display the additional media information in the determined display position.

In this embodiment, the display position of the additional media information is related to the display position of the progress bar. When the user watches the screen, the additional media information is displayed in a region occupied by the progress bar, or is displayed around the region occupied by the progress bar, or some of the additional media information is displayed in the region occupied by the progress bar, or the like. In this way, the additional media information can be displayed by using limited display space on the screen more effectively, interference caused by the display of the additional media information with the display of the main media information is reduced, and the display effect of the additional media information is improved.

In some embodiments, the computing device detects a second user input operation on the main media information (or more specifically, on the progress bar of the main media information. In response to the second user input operation, the computing device moves the progress bar from the first position to a second position of the progress bar on the display and then renders the additional media information at the second position of the progress bar on the display. For example, the computing device removes the additional media information from the first position of the progress bar on the display and then re-renders the additional media information at the second position of the progress bar.

After a preset time period (e.g., 3 seconds), the computing device removes the additional media information from the display. In some embodiments, both the main media information and the additional media information are videos. The preset time period corresponds to a remaining portion of the video that has not been rendered at the first position of the progress bar. In some embodiments, the main media information is a video and the additional media information is a static image.

In some embodiments, before removing the additional media information from the display, the computing device detects a third user input operation on the additional media information and, in response to the third user input operation, the computing device replaces the rendition of the main media information on the display with the rendition of the additional media information on the display.

In some embodiments, the additional media information is rendered continuously when the progress bar moves from the first position to the second position while the rendition of the main media information is interrupted by a period corresponding to a difference between the second position and the first position.

In some embodiments, the foregoing display position of the additional media information may include a reference coordinate, so that the media play client can load a media material of the additional media information based on the reference coordinate, to display the additional media information. The foregoing display position of the progress bar may include a display region, that is, a region occupied by the progress bar when the progress bar is displayed on the screen. The reference coordinate of the additional media information may be located in the display region of the progress bar or is located around the display region. The media play client finishes displaying the additional media information based on the reference coordinate, so that the additional media information can be displayed on the progress bar, or at least some of the additional media information covers the progress bar, or the additional media information is displayed around the progress bar. Here, the reference coordinate may be a static parameter, and is not changed after being determined; or may be a dynamic parameter, and may be changed according to a predetermined rule.

In some embodiments, the foregoing display position of the additional media information may include a reference coordinate and a display track. The display track may be a curved line or a straight line in the display region of the progress bar, or the display track may be a curved line or a straight line partially located in the display region of the progress bar, or the display track is a straight line or a curved line located around the display region of the progress bar. In this way, when displaying the additional media information, the media play client may first display the additional media information based on an initial reference coordinate, and then cause the reference coordinate to move along the display track, so that the displayed additional media information moves along the display track. Further, the additional media information displayed on the screen may move along a track. For example, additional media information used as an advertisement of a car may be an image of a car, and the image of the car moves along a track when being displayed, for example, moves on the progress bar, or moves around the progress bar, or moves along a track passing through the progress bar.

In some embodiments, the display of the additional media information may move with a current movement of a play progress on the progress bar. Step 202 of determining a display position of the additional media information may include: determining an initial reference coordinate according to a current position of a play progress point on the progress bard, the initial reference coordinate being in a position the same as the current position of the play progress point or being around the play progress point. Step 203 of displaying the additional media information in the determined display position may include: displaying the additional media information based on the initial reference coordinate; listening to a change of a position of a play progress point; and when the position of the play progress point changes, determining a new reference coordinate according to the current position of the play progress point and a display track, to cause the reference coordinate to move with the play progress point along the display track, so that the displayed additional media information moves with the play progress point along the display track. The determined new reference coordinate is in a position the same as the current position of the play progress point or is around the play progress point.

In the foregoing embodiment, the additional media information may be displayed dynamically, and the display position of the additional media information may be changed with the change of the position of the play progress point on the progress bar. When the user watches the screen, the additional media information is kept being displayed at or around the play progress point on the progress bar. In this way, not only can the additional media information be displayed by using limited display space on the screen more effectively, and interference caused by the display of the additional media information with the display of the main media information can be reduced, but also it is easier for the user to notice the additional media information, so that the display effect, the attention degree, and the push effect of the additional media information are improved, and the user experience of using the media play client is improved.

In some embodiments, step 202 of determining a display position of the additional media information may include: reading a preset reference coordinate; or determining a reference coordinate according to a current position of a play progress point on the progress bar. The reference coordinate may be in a position the same as the current position of the play progress point or is around the play progress point. Applicants of this application further find, in research, that when watching a video program on a video website, a user usually drags a progress bar used for playing the video. Therefore, the following specific embodiments are further provided. In these embodiments, the habit of the user of dragging the progress bar of the main media information is used. When the user drags the progress bar, the additional media information is displayed. The additional media information does not affect watching of video content. In addition, because it is ensured that the user watches the screen when dragging the progress bar, it is ensured that the additional media information will be watched by the user. According to different application scenarios, the additional media information may be a video advertisement, news information, or the like.

Figure 2B:
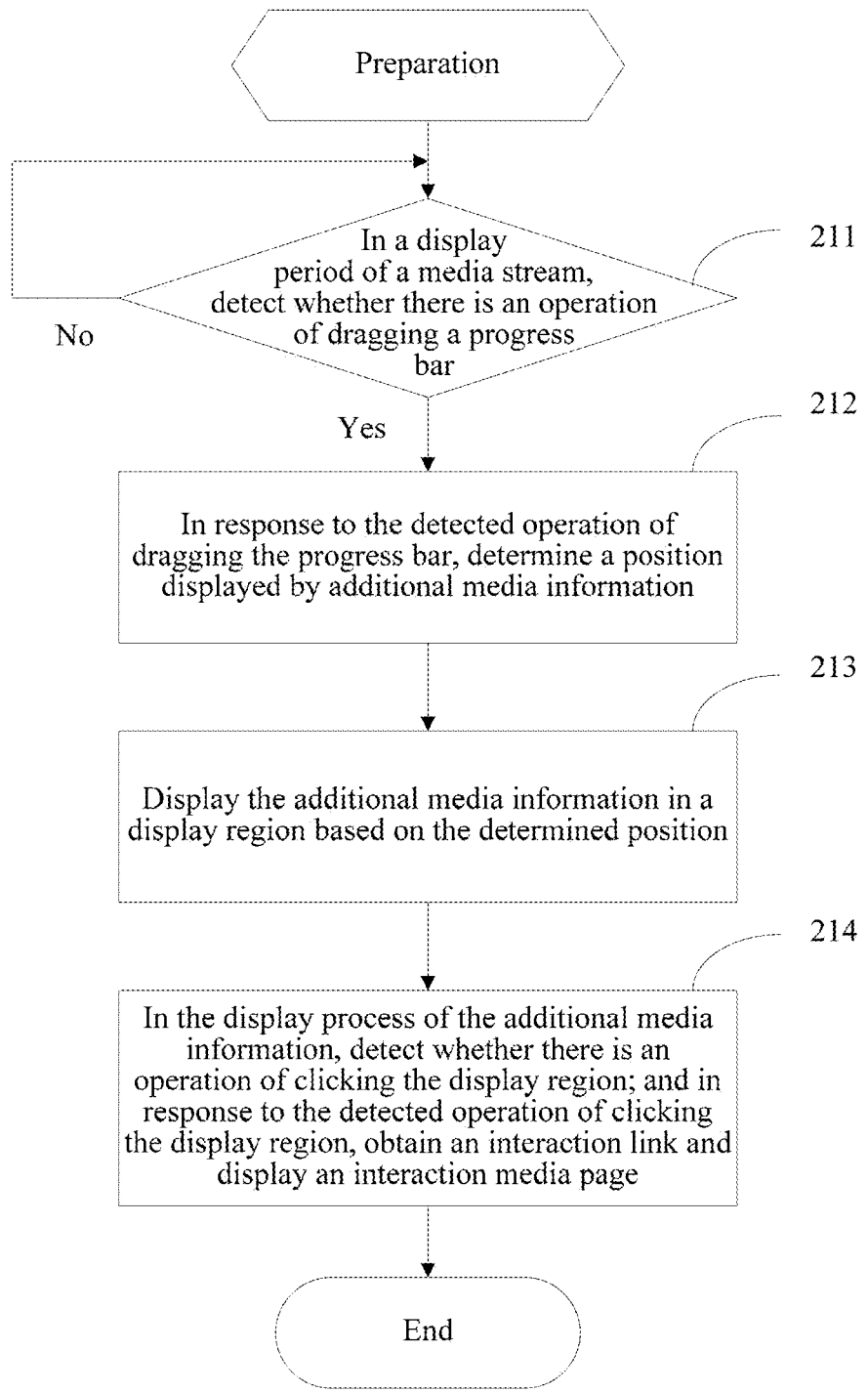
FIG. 2B is a schematic flowchart of an additional media information display method according to an embodiment of this application.

FIG. 2B shows a process of an additional media information method according to an embodiment of this application. The process is applied to a media play client, and includes the following steps:

Step 211: In a display period of a media stream (a type of main media information), detect whether there is an operation of dragging a progress bar (an input operation of a user); and if yes, perform step 212; or otherwise, continuously perform this step to perform the detection.

The display period of the media stream includes time when, before, and after the video content of the media stream is played, for example, that the media file is prepared to be played, the media file is being played, the media file is suspended to be played, or play of the media file is finished.

Step 212: Determine, in response to the detected operation of dragging the progress bar, a reference coordinate displayed by additional media information.

The display region occupied by the additional media information on the screen during the display of the additional media information (the display region can represent the display position of the additional media information) is determined by both the reference coordinate of the additional media information and the shape and area of the display region. The shape and area of the display region usually relate to to-be-displayed additional media information content.

The reference coordinate may be located out of a play window of the media stream, which may be a preset fixed position. Preferably, the reference coordinate should be related to the operation of dragging the progress bar, for example, appears on or near the progress bar. The reference coordinate may be the center of the display region of the additional media information, or may be a coordinate at an edge of the display region, or certainly may be any point in the display region.

Step 213: Display the additional media information in a display region of the additional media information based on the determined reference coordinate.

Step 214: In the display process of the additional media information, detect whether there is an operation of clicking the display region; and obtain, in response to the detected operation of clicking the display region, an interaction link and display an interaction media page. This step is an optional step.

In the foregoing embodiment, a habit that a user usually drags a progress bar of a media play client when watching online main media information (for example, a video website) is used. When the user drags the progress bar, the additional media information is displayed. In this way, the display of the additional media information does not affect watching of the main media information (for example, an online video). Therefore, not only no additional time will be occupied, but also the play effect is improved. In addition, because it is ensured that the user watches the screen when dragging the progress bar, it is ensured that the additional media information will be watched by the user, and therefore the watching effect is ensured.

According to another embodiment of this application, the additional media information is no longer displayed after being displayed for a particular duration. The duration may be a preset value, for example, 3 seconds. Alternatively, when the progress bar is dragged to play the video program, the player (that is, the media play client) usually needs to buffer, and the video program cannot be played normally during the buffer. Therefore, the play duration of the additional media information may alternatively be a quantity of time required for the buffer caused by the operation of dragging the progress bar, so that no bad effect will be caused to the watching of the user. In some embodiments, when the reference coordinate moves along the display track, the movement speed may be associated with the quantity of time required for buffer caused by dragging the progress bar. For example, a larger quantity of time required for the buffer indicates a lower movement speed.

In addition, if being at a PC end, the media play client may further include: the additional media information may disappear (that is, is stopped to be played) after being played for a particular duration, provided that after the progress bar is dragged, a mouse pointer displayed on the screen does not move or is not in the display region of the additional media information. If the mouse pointer is in the display region of the additional media information and continuously shakes, the additional media information may be continuously displayed, so that the additional media information is kept being displayed on the screen.

According to an embodiment of this application, the reference coordinate displayed by the additional media information is an end point of dragging the progress bar. According to another embodiment of this application, the reference coordinate displayed by the additional media information may alternatively be a start point of dragging the progress bar, or any position from the start point to the end point, or the reference coordinate moves from the start point to the end point. In another embodiment, the reference coordinate may alternatively be unrelated to the start point or the end point, but instead, appears near the progress bar.

Figure 3:
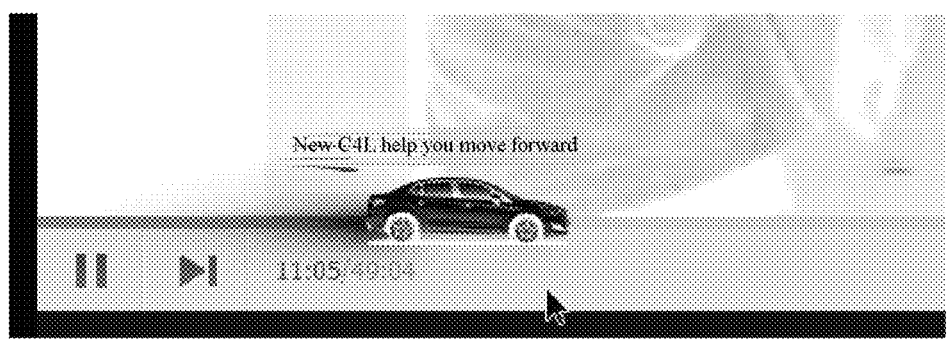
FIG. 3 is a schematic diagram of a display region according to an embodiment of this application.

According to another embodiment of this application, the foregoing display region of the additional media information may be a strip region distributed along the progress bar. The width of the strip region may be determined according to actual played content of the additional media information, and is proper provided that watching of an image of a video program is not affected. FIG. 3 shows an example of a display region. A car and text is a video advertisement (a type of additional media information) played according to the solution of this embodiment, and may be a static image or may be a dynamic image or video. A position in which the car appears may be a position in which the car parks (for example, a start point, an end point, or another position of dragging), or the position of the car moves along the progress bar.

The foregoing display region of the additional media information may be in the display region occupied by the progress bar, or may be partially or totally located in a display region occupied by a main window of the main media information (for example, the video program), provided that the display of the main media information is not essentially affected.

Figure 4:
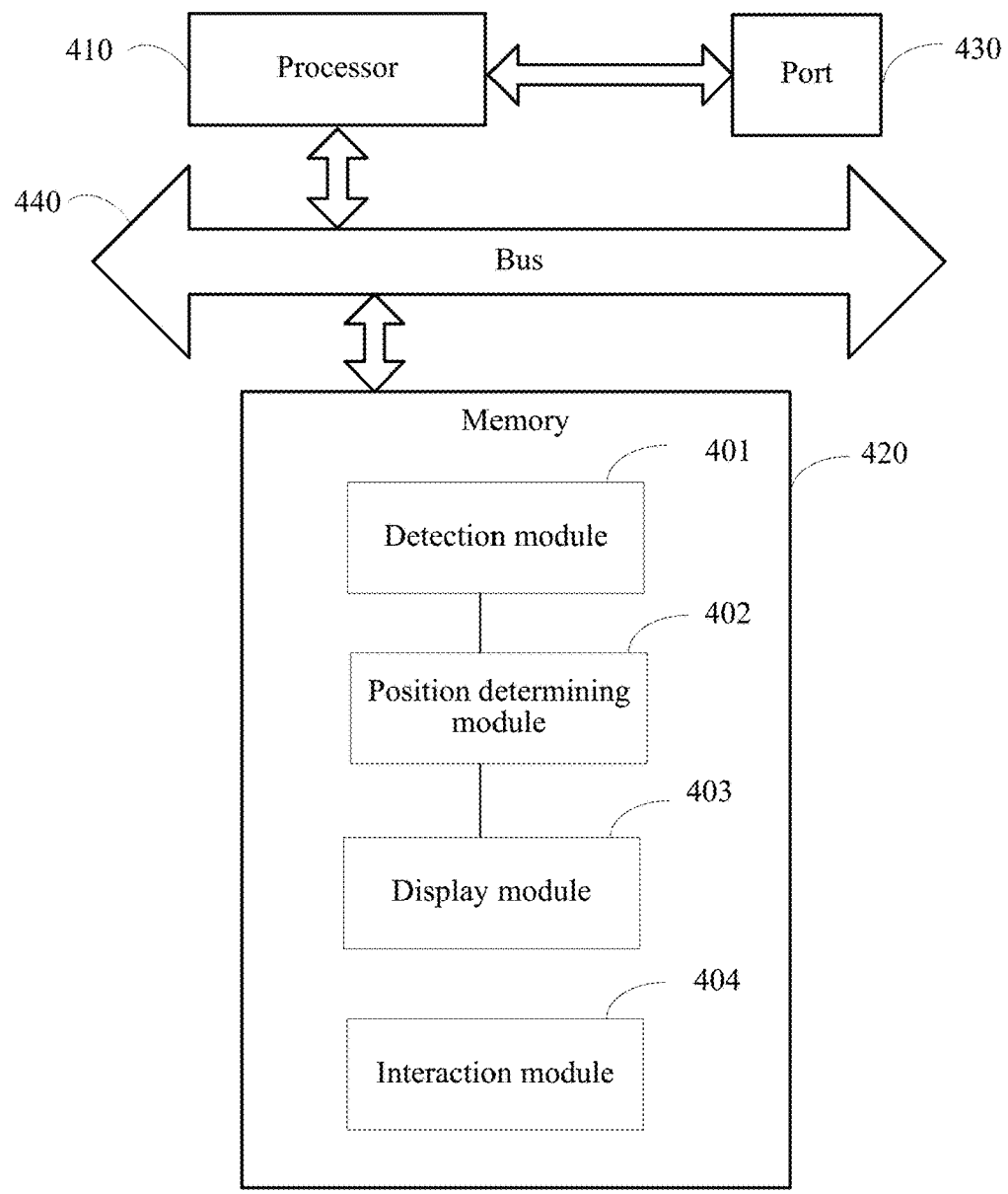
FIG. 4 is a schematic diagram of an additional media information display apparatus according to an embodiment of this application.

Based on the foregoing method embodiments, an embodiment of this application further provides an additional media information display apparatus. The apparatus is located on a media play client. As shown in FIG. 4, the apparatus includes a detection module 401, a position determining module 402, and a display module 403.

The detection module 401 is configured to: in a display period of main media information, when it is determined that a display condition of additional media information corresponding to the main media information is met, trigger a position determining module 402.

The position determining module 402 is configured to determine a display position of the additional media information, the display position of the additional media information being related to a display position of a progress bar of the main media information. Here, when it is determined that the foregoing display condition is met, the detection module 401 can trigger the position determining module 402, and the position determining module 402 can implement the foregoing function when the foregoing display condition is met. Specifically, the detection module 401 can determine (for example, listen to) a play progress of the main media information and/or detect (for example, listen to) an input operation of a user. When it is determined that the play progress of the main media information reaches a preset time point and/or when the input operation of the user is detected, it is determined that the foregoing display condition is met.

The display module 403 is configured to display the additional media information in the determined display position.

In some embodiments, the foregoing display condition may include that the play progress of the main media information reaches the preset time point (for example, a video file used as the main media information is played at the preset time point) and/or that the input operation of the user is received. That the input operation of the user is received may include at least one of the following:

1) receiving an operation performed on a touchscreen of the electronic device;

2) receiving an operation performed on the progress bar;

3) receiving a gesture operation by using a gravity acceleration sensor in the electronic device; and 4) receiving a gesture operation by using a wearable device bound to the electronic device.

In some embodiments, the display position of the additional media information may include a display region. The apparatus may further include an interaction module 404, configured to: in the display process of the additional media information, detect whether there is an operation of clicking the display region; and obtain, in response to the detected operation of clicking the display region, an interaction link and display an interaction media page.

In some embodiments, the display position of the additional media information includes a reference coordinate. The display position of the progress bar includes a display region. The reference coordinate is located in the display region or is located around the display region. The display module 403 may display the additional media information based on the reference coordinate.

In some embodiments, the display position of the additional media information further includes a display track. The display track is a curved line or a straight line in the display region, or the display track is a curved line or a straight line partially located in the display region, or the display track is a straight line or a curved line located around the display region. The display module 403 may display the additional media information based on the reference coordinate, to cause the reference coordinate to move along the display track, so that the displayed additional media information moves along the display track.

In some embodiments, the foregoing display condition is that an operation of dragging a progress bar by the user is received. Each module in FIG. 4 may perform the following processing:

the detection module 401 may detect, during a period of displaying a media stream (a type of main media information) by the media play client, whether there is an operation of dragging the progress bar;

the position determining module 402 may determine, in response to the detected operation of dragging the progress bar, a reference coordinate displayed by the additional media information, and notify the display module 401 of the reference coordinate; and the display module 403 may display the additional media information in the display region of the additional media information based on the determined reference coordinate.

According to the application environment shown in FIG. 1, it can be learned that the main media information such as the media stream is from the main media server (for example, a video server) 101, and the additional media information is from the additional media information server 102.

In another embodiment of this application, the apparatus may further include:

an interaction module 404, configured to: in the display process of the additional media information, detect whether there is an operation of clicking a display region of the additional media information; and obtain, in response to the detected operation of clicking the display region, an interaction link and display an interaction media page.

In another embodiment of this application, the display module 403 may no longer display the additional media information after displaying the additional media information for a particular duration.

In some embodiments, the duration is a preset value, or is a quantity of time required by buffer caused by dragging the progress bar.

In some embodiments, the reference coordinate is a start point, an end point, or any position from the start point to the end point of dragging the progress bar, or the reference coordinate moves from the start point to the end point.

In an embodiment of this application, the display region is a region distributed along the progress bar, for example, a strip region being at the two sides of the progress bar and occupying a particular width.

In an embodiment of this application, the media play client is located at a PC end. After the progress bar is dragged, if a mouse pointer displayed on a screen does not move or is not in the display region of the additional media information, the display module 403 may no longer display the additional media information after displaying the additional media information for a particular duration; or if the mouse pointer is in the display region and continuously shakes, the display module 403 can keep displaying the additional media information.

In addition, modules in the embodiments of this application may be integrated into one processing unit, or each of the modules may exist alone physically, or two or more apparatus or modules may be integrated into one unit. The integrated unit may be implemented in a form of hardware, or may be implemented in a form of a software functional unit.

In an embodiment, the foregoing additional media information display apparatus may run in any computing device that can display media (for example, a computing device including a display interface), and is loaded in a memory of the computing device. The memory may include a random access memory (RAM) and/or a non-volatile memory, and/or the like. As shown in FIG. 4, in addition to including the modules 401 to 404 of the foregoing additional media information display apparatus, the computing device may further include a memory 420, a processor 410, a bus 440, and a port 430. The processor 410 and the memory 420 are interconnected by using the bus 440. The processor 410 may receive and send data by using the port 430, to implement network communication and/or local communication. The modules 401 to 404 may be modules in the memory 420 that store machine executable instructions. The processor 410 executes the machine executable instructions included in the modules 401 to 404 of the memory 420, to implement the functions of the modules 401 to 404.

In the foregoing computing device, specific methods for the modules 401 to 404 to implement the functions thereof are all described in the foregoing method embodiments, and details are not described herein again.

When the computing device in which the foregoing additional media information display apparatus is located is a PC, the computing device may include a peripheral input device that can receive an operation of a user, such as a keyboard, a mouse, a touchscreen, or a handle. Only in this way can the detection module 401 listen to an input operation of the user, and further trigger the processing of the position determining module 402 and the display module 403. When the computing device in which the foregoing additional media information display apparatus is located is a mobile terminal, the computing device may include a component that can receive an input operation of a user, such as a button, a touchscreen, or remote control, or may include a component such as gyroscope or a gravity acceleration sensor that can sense a posture change of the computing device. Only in this way can the detection module 401 listen to an input operation of the user, and further trigger the processing of the position determining module 402 and the display module 403.

In addition, each embodiment of this application may be implemented by a data processing program executed by a data processing device such as a computer. Apparently, the data processing program constitutes this application. In addition, generally, a data processing program stored in a non-transitory computer readable storage medium is directly read from the storage medium for execution or the program is installed on or replicated to a storage device (such as a hard disk or memory) of a data processing device for execution. Therefore, such a non-transitory computer readable storage medium also constitutes this application. The non-transitory computer readable storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, this application further discloses a non-transitory computer readable storage medium, which stores a data processing program. The data processing program is used for executing any embodiment of the foregoing method of this application.

It should be understood that, although this specification is described according to each implementation, each implementation may not include only one independent technical solution. The description manner of this specification is merely for clarity. This specification should be considered as a whole by a person skilled in the art, and the technical solution in each implementation may also be properly combined, to form other implementations that can be understood by the person skilled in the art.

The foregoing descriptions are merely preferable embodiments of this application, but are not intended to limit the protection scope of this application. Any modification, equivalent replacement, or improvement made without departing from the spirit and principle of the technical solutions of this application should fall within the protection scope of this application.

What is claimed is:

1. A media information display method performed at a computing device having a touchscreen display, one or more processors and memory storing a plurality of programs to be executed by the one or more processors, the method comprising:
  while rendering main media information on the touchscreen display:
    detecting a first user input operation on the main media information;
    in response to the first user input operation:
      determining a first position of a progress bar of the main media information on the touchscreen display according to a first location of the first user input operation on the touchscreen display and rendering additional media information at the first position of the progress bar on the touchscreen display, the additional media information corresponding to an advertisement, and the main media information comprises non-advertisement content;
    detecting a second user input operation on the touchscreen display;
    in response to the second user input operation:
      determining a second position of the progress bar of the main media information on the display according to a second location of the second user input operation on the touchscreen display;
      moving the progress bar from the first position to the second position of the progress bar on the touchscreen display;
      continuously rendering the additional media information when the progress bar moves from the first position of the progress bar to the second position of the progress bar on the touchscreen display while the rendition of the main media information is interrupted by a period corresponding to a difference between the second position and the first position; and
    removing the additional media information from the touchscreen display after a preset time period, wherein both the main media information and the additional media information are videos.

2. The method according to claim 1, wherein the preset time period corresponds to a remaining portion of the additional media information that has not been rendered at the first position of the progress bar.

3. The method according to claim 1, wherein the second user input operation is applied to the progress bar of the main media information.

4. The method according to claim 1, further comprising:
  before removing the additional media information from the touchscreen display:
    detecting a third user input operation on the additional media information;
    in response to the third user input operation:
      replacing the rendition of the main media information on the touchscreen display with the rendition of the additional media information on the touchscreen display.

5. A computing device having a touchscreen display, one or more processors, memory coupled to the one or more processors, and a plurality of programs stored in the memory that, when executed by the one or more processors, cause the computing device to perform a plurality of operations including:
  while rendering main media information on the touchscreen display:
    detecting a first user input operation on the main media information;
    in response to the first user input operation:
      determining a first position of a progress bar of the main media information on the touchscreen display according to a first location of the first user input operation on the touchscreen display and rendering additional media information at the first position of the progress bar on the touchscreen display, the additional media information corresponding to an advertisement, and the main media information comprises non-advertisement content;
    detecting a second user input operation on the touchscreen display;
    in response to the second user input operation:
      determining a second position of the progress bar of the main media information on the display according to a second location of the second user input operation on the touchscreen display;
      moving the progress bar from the first position to the second position of the progress bar on the touchscreen display;
      continuously rendering the additional media information when the progress bar moves from the first position of the progress bar to the second position of the progress bar on the touchscreen display while the rendition of the main media information is interrupted by a period corresponding to a difference between the second position and the first position; and removing the additional media information from the touchscreen display after a preset time period, wherein both the main media information and the additional media information are videos.

6. The computing device according to claim 5, wherein the preset time period corresponds to a remaining portion of the additional media information that has not been rendered at the first position of the progress bar.

7. The computing device according to claim 5, wherein the second user input operation is applied to the progress bar of the main media information.

8. The computing device according to claim 5, wherein the plurality of operations further comprise:
  before removing the additional media information from the touchscreen display:
    detecting a third user input operation on the additional media information;
    in response to the third user input operation:
      replacing the rendition of the main media information on the touchscreen display with the rendition of the additional media information on the touchscreen display.

9. A non-transitory computer readable storage medium storing a plurality of programs in connection with a computing device having a touchscreen display and one or more processors, wherein the plurality of programs, when executed by the one or more processors, cause the computing device to perform a plurality of operations including:
  while rendering main media information on the touchscreen display:
    detecting a first user input operation on the main media information;
    in response to the first user input operation:
      determining a first position of a progress bar of the main media information on the touchscreen display according to a first location of the first user input operation on the touchscreen display and rendering additional media information at the first position of the progress bar on the touchscreen display, the additional media information corresponding to an advertisement, and the main media information comprises non-advertisement content;
      detecting a second user input operation on the touchscreen display;
      in response to the second user input operation:
        determining a second position of the progress bar of the main media information on the display according to a second location of the second user input operation on the touchscreen display;
        moving the progress bar from the first position to the second position of the progress bar on the touchscreen display;
        continuously rendering the additional media information when the progress bar moves from the first position of the progress bar to the second position of the progress bar on the touchscreen display while the rendition of the main media information is interrupted by a period corresponding to a difference between the second position and the first position; and
        removing the additional media information from the touchscreen display after a preset time period, wherein both the main media information and the additional media information are videos.

10. The non-transitory computer readable storage medium according to claim 9, wherein the plurality of operations further comprise:
  before removing the additional media information from the touchscreen display:
    detecting a third user input operation on the additional media information;
    in response to the third user input operation:
      replacing the rendition of the main media information on the touchscreen display with the rendition of the additional media information on the touchscreen display.

11. The non-transitory computer readable storage medium according to claim 9, wherein the preset time period corresponds to a remaining portion of the additional media information that has not been rendered at the first position of the progress bar.

12. The non-transitory computer readable storage medium according to claim 9, wherein the second user input operation is applied to the progress bar of the main media information.

* * * * *